Aug. 22, 1950     A. R. THOMPSON     2,519,985
CUTTING MACHINE
Filed June 18, 1945     5 Sheets—Sheet 1
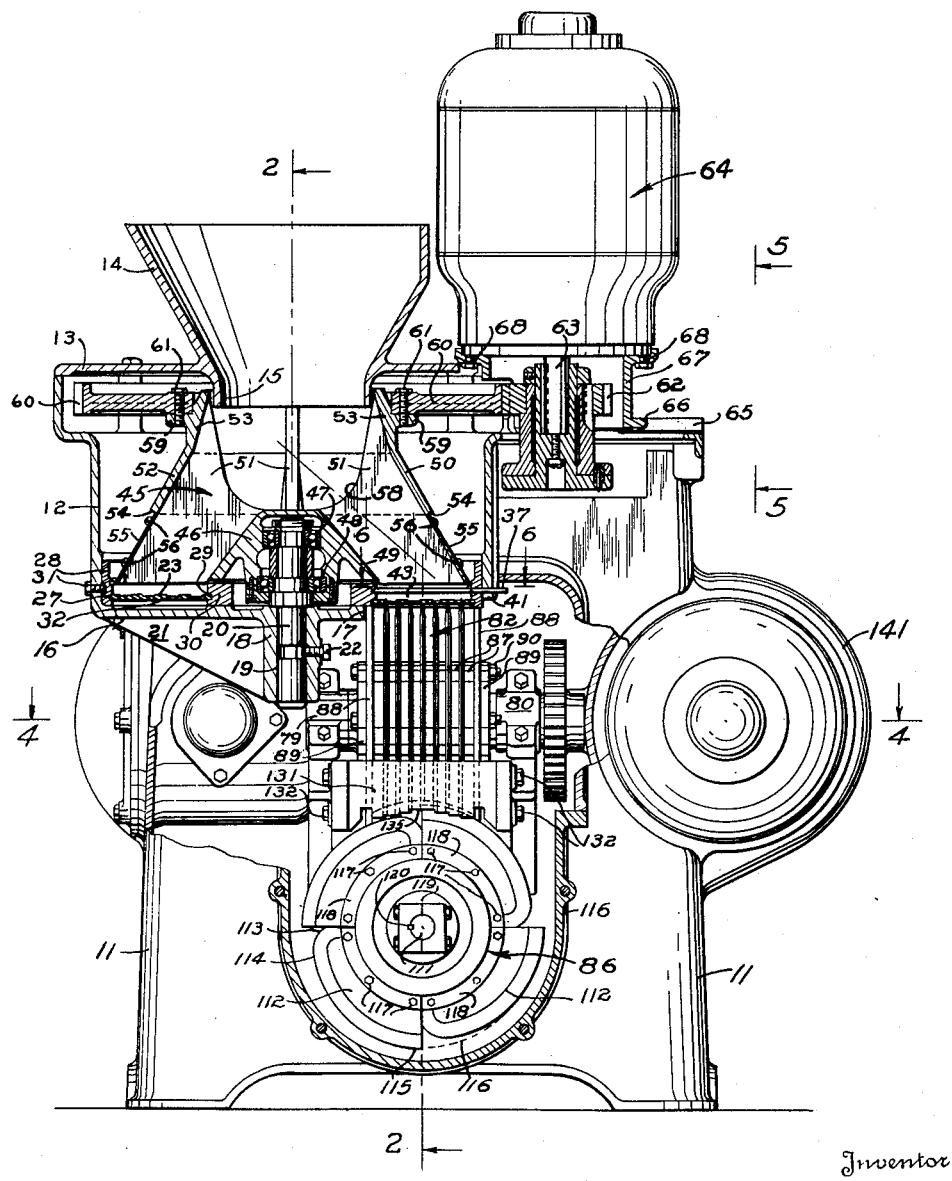
FIG_1
Inventor
ALBERT R. THOMPSON.
By Philip G. Minnis
Attorney Aug. 22, 1950 A. R. THOMPSON 2,519,985
CUTTING MACHINE
Filed June 18, 1945 5 Sheets-Sheet 2

Inventor
ALBERT R. THOMPSON.
By Philip G. Minnis.
Attorney

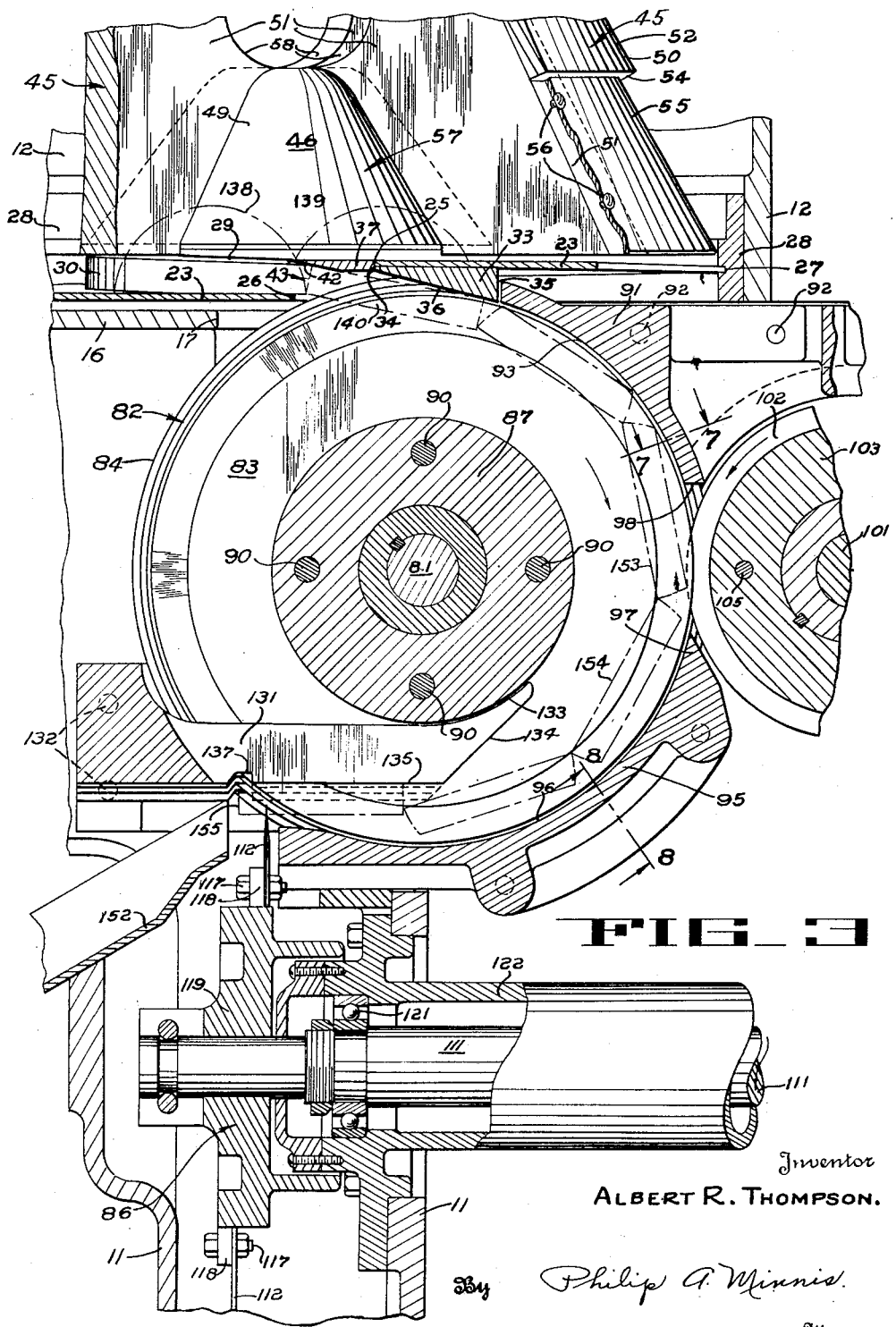

Inventor
ALBERT R. THOMPSON.
By Philip A. Minnis.
Attorney

Aug. 22, 1950     A. R. THOMPSON     2,519,985
CUTTING MACHINE
Filed June 18, 1945     5 Sheets-Sheet 5
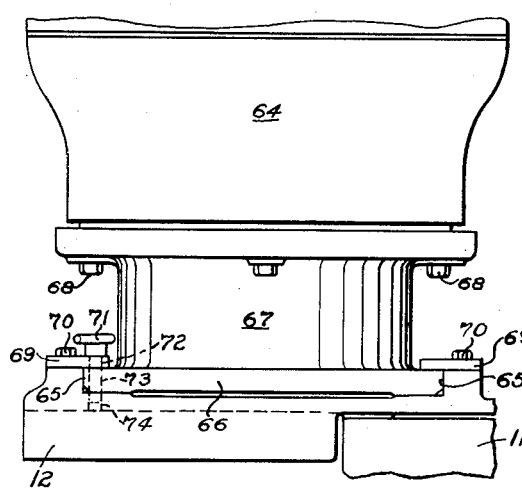
FIG_5
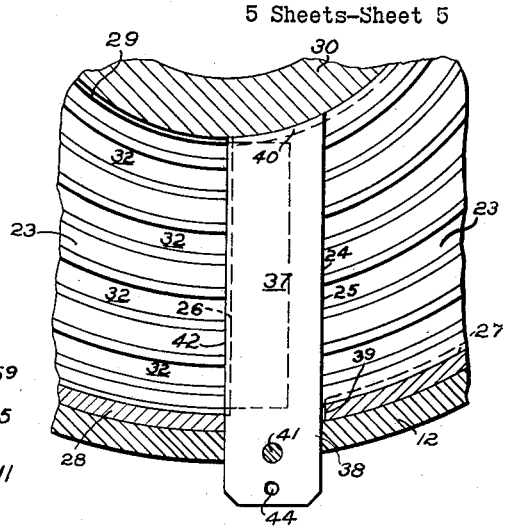
FIG_6
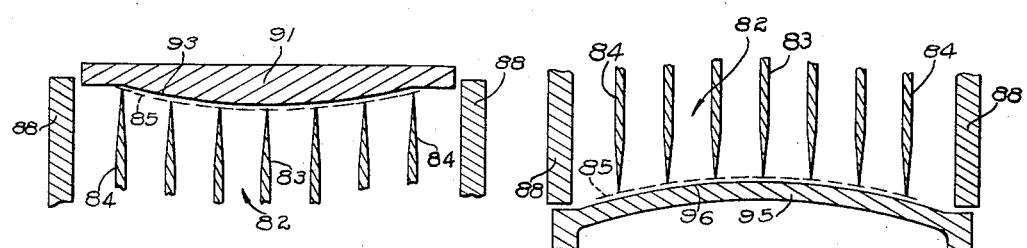
FIG_7     FIG_8
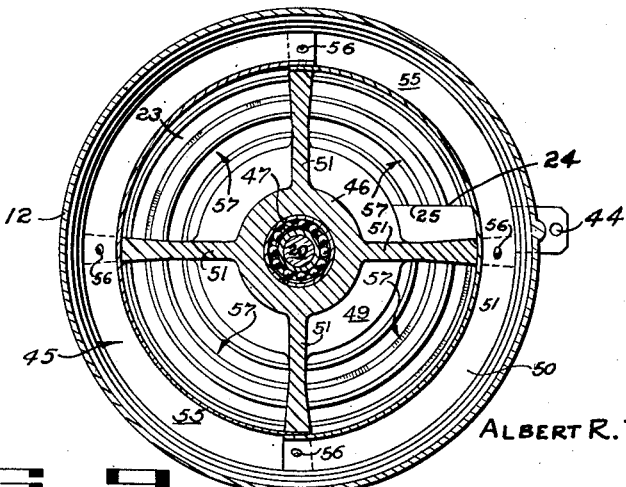
FIG_9
Inventor
ALBERT R. THOMPSON.
By Philip A. Minnis.
Attorney Patented Aug. 22, 1950

2,519,985

UNITED STATES PATENT OFFICE 2,519,985

CUTTING MACHINE

Albert R. Thompson, Los Gatos, Calif., assignor to Food Machinery and Chemical Corporation, a corporation of Delaware Application June 18, 1945, Serial No. 600,199

10 Claims. (Cl. 146—124)

This invention relates to cutting machines and more particularly to machines for cutting food materials, such as fruits and vegetables, into pieces of uniform size and cubical shape. Machines of this type are useful in the canning industry where various fruits and vegetables are diced before being placed in the can, and the machine of the present invention is an improvement of the machine shown in United States Letters Patent No. 2,318,904 granted to me May 11, 1943.

In machines especially designed to be used for dicing fruits and vegetables, it has been the practice to deliver the food material to a series of knives arranged to first cut the material into slabs. The slabs then are delivered to a second series or gang of knives so arranged with respect to the slab cutting knives that the slabs are cut into elongated strips. The strips of material are then cut crosswise into pieces of cubical form. Thus, three distinct cutting operations are successively performed on the food materials. The construction and arrangement of the slab cutting knives and the strip slicing knives are such that several layers of slabs of material may be fed at the same time to the strip slicing knives. This occasionally caused clogging of the material and during the strip slicing operation this clogging sometimes resulted in the material being crushed. Also, as the result of clogging of the material, a haphazard arrangement of the strips sometimes occurred so that when the strips were fed toward the cube cutters some of the strips were so out of place that they would be cut at such an angle that diamond-shaped pieces were obtained.

An object of the present invention is to provide an improved dicing machine in which the percentage of perfect cubes of material is considerably greater than has heretofore been obtainable.

Another object of the present invention is to provide an improved dicing machine in which the material is delivered to the slab cutter by a conical type of feeder.

Another object of the present invention is to provide an improved dicing machine in which only a single layer of slabs of material is fed to the strip slicing knives at one time.

Another object of the present invention is to provide an improved machine of the above type in which the feeding or delivery of the material to the several cutters is always under control.

Another object of the present invention is to provide an improved machine for dicing fruit, vegetables and like materials, in which the strips cut from the slabs are adapted to remain substantially in a predetermined path and are fed to the cube cutter in such position that the number of diamond-shaped pieces is materially reduced.

Another object of the invention is to provide an improved dicing machine of the above type in which the feeding of the materials through the machine is accomplished solely by gravity and the movement of the cutters.

Another object of the invention is to provide an improved machine for producing diced fruits, vegetables, and the like, which is simple in construction, thoroughly reliable and efficient in operation, and in which the parts susceptible to wear are so installed as to be readily accessible for repair or adjustment.

Another object of the present invention is to provide an improved cutting machine of the above type which has a high capacity, due to the fact that it can be operated at high speed with a variety of food materials, without injuring or wasting the materials being handled.

I attain these and other objects of my invention by the mechanism illustrated in the accompanying drawings, in which:

Fig. 1 is a vertical sectional view of the improved cutting machine taken approximately along the line 1—1 of Fig. 2;

Fig. 3 is an enlarged detail sectional view of a portion of the structure shown in Fig. 2;

Fig. 5 is a detail elevation of a portion of the upper electric motor showing the manner in which it is mounted on the housing of the machine, as viewed from the line 5—5 of Fig. 1;

Fig. 6 is an enlarged detail horizontal sectional view taken along the line 6—6 of Fig. 1;

Fig. 7 is an enlarged detail sectional view taken along the line 7—7 of Fig. 3;

Fig. 8 is an enlarged detail sectional view taken along the line 8—8 of Fig. 3;

Fig. 9 is an enlarged horizontal sectional view taken along the line 9—9 of Fig. 2;

Figure 2:
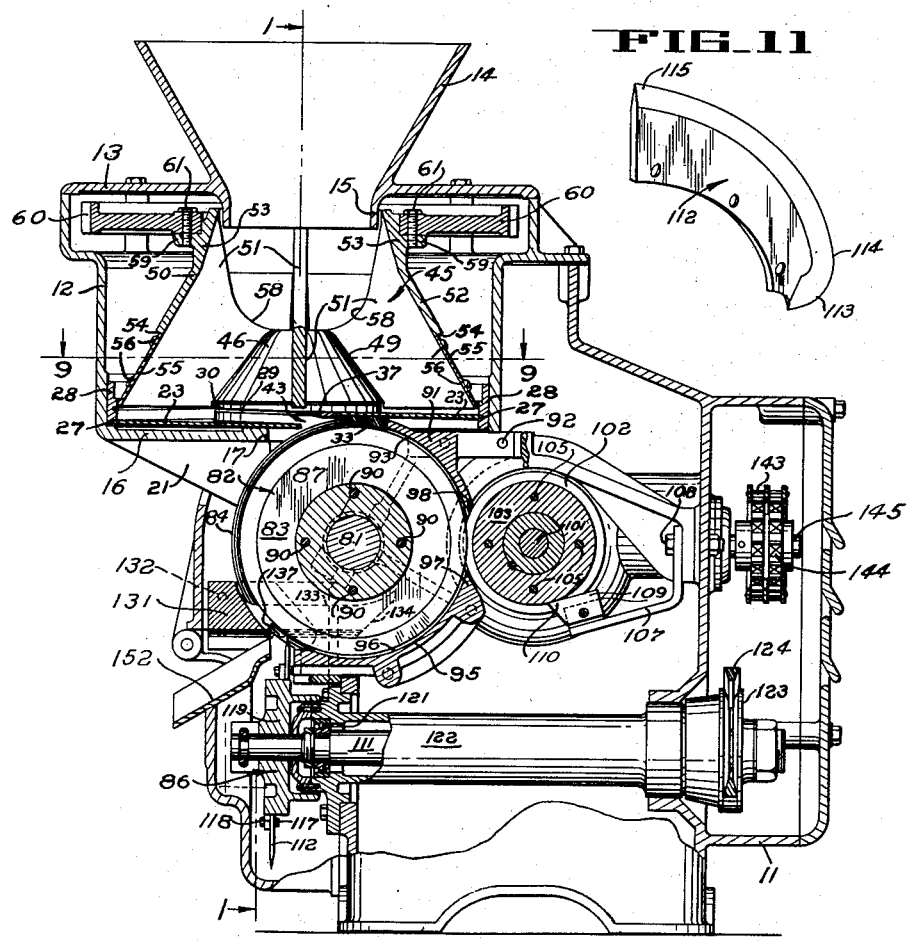
Fig. 2 is a vertical sectional view taken approximately along the line 2—2 of Fig. 1.

Referring to the drawings, the improved machine comprises a main frame 11 and a secondary frame 12 which is supported by the upper portion of the frame 11, in the manner shown best in Figs. 1 and 2. The two frames 11 and 12 are constructed and arranged so as to enclose, as well as to provide means by which the several working parts of the machine are supported therein.

At convenient points in the walls of the frame 11 suitable openings are provided, so that the mechanism within the frame can be easily made accessible from the outside, and these openings are enclosed by suitable covers which are detachably secured to the frame in the manner shown.

Mounted on the upper portion of frame 12 is a cover 13, having formed integral therewith an upwardly extending conical portion 14 and a downwardly extending portion 15. The parts 14, 15 constitute a chute which is designed to guide the materials to be cut up or diced towards the slabber mechanism, in the manner to be hereinafter more fully described.

The frame 12 is formed with a bottom wall 16 which extends only partly across the whole bottom of the frame so as to provide an opening 17 in said bottom.

At a point in vertical alignment with the vertical center line of the chute 14, the bottom wall 16 is formed with a depending boss 18 which is bored, as indicated at 19, for the reception of a spindle 20, arranged vertically in the machine in the manner shown in Fig. 1. A plurality of ribs 21 may be formed integrally with the wall 16 and the boss 18, so as to reinforce the bottom of the frame 12. The spindle 20 is fixedly secured in position in the boss 18 by means of a set screw 22, as shown in Fig. 1.

Disposed in suitable spaced relation above the bottom wall 16 of the frame 12, is an annular helically convoluted table 23, which is preferably formed from suitable sheet material. The inner circular edge of the table is concentric with the peripheral edge thereof and has a suitable diameter whereby a relatively large opening is provided in the center of the table for the spindle 20 and parts associated therewith to be hereinafter described.

The body of the table 23 is formed with a cut out portion to provide an opening or slot 24 having edges 25, 26 extending transversely across the table from the peripheral edge to the inner circular edge thereof, the edge 26 being arranged substantially radially with respect to the center of curvature of the periphery of the table and the edge 25 being parallel with the edge 26 and spaced therefrom in the manner shown in Fig. 6. The portion of the table 23 in which the slot 24 is formed overlies the opening 17 in the frame 12.

From one edge 25 of the slot 24 to the other edge 26 of said slot, the top surface of the table 23 is disposed in a plane inclined slightly with respect to the horizontally disposed bottom wall 16 of the frame 12. In other words the table 23 is made in the form of a helix of approximately one convolution extending from the edge 25 to the edge 26.

In order to retain the table 23 in helical form, the periphery of said table is mounted in a slot or groove 27 formed spirally in the inner wall of a ring 28, and the inner circular edge of the table 23 is mounted in a slot or groove 29 formed spirally in the outer wall of a ring 30. The edges of the sheet material, of which the table 23 is formed, are connected to the rings 28, 30, respectively, by soldering, welding, or in any other suitable manner, so that separation of the parts 23, 28 and 30 is prevented after they have been assembled. The rings 28 and 30 enclose the gap between ends 25, 26 of the table, and the grooves 27 and 29 are formed like screw threads in the rings 28 and 30, respectively, so that the parts can be screwed together during the assembly operation.

As shown in Fig. 1, provision is made on the portion of the bottom wall 16 surrounding spindle 20 for supporting the inner ring 30 of the table 23, and the outer ring 28 fits snugly against the wall of the frame 12 and rests on the bottom 16. The table is retained in fixed position in the frame 12 by means of a screw or bolt 31, which is mounted in the frame and in the outer ring 28 of said table in the manner shown in Fig. 1.

The grooves 27 and 29 in the rings 28 and 30, respectively, are so formed that the edge 25 of the table is disposed in a plane located a suitable distance above the plane in which the edge 26 is disposed, so that at the point in said table in which the slot 24 is located there is provided a vertical step or gap 43. In this way the table 23 provides an annular helically convoluted surface adapted to receive material to be cut into slabs, the inclination of the helix being such that the step or gap 43 between the ends of the helix provides an opening through which the slabs of material are discharged. The rings 28 and 30 close the outer and inner ends of the opening 43.

In order to prevent sticking of the material on the table 23, by suction or otherwise, the upper surface of said table is formed with a plurality of annular grooves 32. The grooves 32 are preferably concentric with respect to the central opening of the table, as defined by the inner ring 30, and said grooves are coextensive with the table in that the grooves extend from edge 25 of the slot 24 and terminate at the other end at the edge 26 of said slot. Since the grooves 32 are separated by ribs or ridges, the ribs will support the fruit and vegetables so that there will not be any tendency for these materials to adhere to the table and interfere with the free movement of the material through the machine in the manner to be hereinafter more fully described.

As shown best in Fig. 3, adjacent to the edge 25, the underside of the table 23 has mounted thereon and secured thereto by any suitable means, such as by welding, a block 33. The block 33 is tapered or wedge-shaped in cross section, the front edge 34 of said block which is disposed substantially in alignment with the edge 25 of the table 23 being very thin as compared to the rear edge 35 of said block, so that the bottom surface 36 of said block is inclined downwardly at an angle with respect to the bottom of the table 23 and in a direction away from the opening 43 between the spaced ends of the helical surface heretofore described.

A knife 37 having a tapered cutting edge 42 formed lengthwise along one face thereof, is disposed in the space or gap formed in the table 23 by slot 24 with the tapered portion faced downwardly and with its edge opposite to the cutting edge 42 abutting the edge 25 of the table 23, as shown in Fig. 3. The knife is inserted into the machine through aligned openings 38, 39 formed respectively in the side walls of the frame 12 and the outer ring 28, the inner arcuate end 40 of said knife being mounted or inserted in the groove 29 in the inner ring 30.

The arrangement of the parts is such that lateral displacement of the knife 37 is prevented in either direction. During operation of the machine the materials are moved toward the cutting edge 42 of the knife, thereby keeping said knife tightly against the edge 25 of the table 23, and due to the manner in which the arcuate end 40 of the knife is mounted in the groove 29 of the inner ring 30, the inner end of said knife cannot shift toward the left, as viewed in Fig. 6. Also, the knife 37 is retained in position in the machine from lengthwise movement by means of a bolt 41 which is inserted in aligned openings in the knife and frame 12, in the manner shown in Figs. 1 and 6.

When it is desired to remove the knife for the purpose of sharpening its cutting edge 42, or for replacement, the locking bolt 41 is unscrewed and a suitable tool (not shown) is attached to the knife by inserting an end of such tool in an opening 44 provided therefor in the outer end of the knife which is conveniently disposed outside of the frame 12. By pulling the tool outwardly with respect to the machine the knife 37 can be withdrawn. The construction and arrangement of the parts is such that a guideway is provided in the machine for the knife 37 so that the knife can be quickly inserted in position in the table 23 and then be retained in position by bolt 41.

The manner in which the knife 37 is mounted in the machine is such that the upper face of the knife is disposed substantially in alignment with the upper surface of the table 23, and with the cutting edge 42 of the knife disposed substantially in vertical alignment with the edge 26 of the table. The opening between the cutting edge 42 of the knife 37 and the upper surface of the table at the edge 26 has a vertical width equal substantially to the thickness of the slabs of material formed by the machine.

Suitable mechanism to be next described is provided for moving the material towards the cutting edge 42 of the knife 37.

A rotatable member 45 having a hub 46 supported by upper and lower bearings 47, 48, respectively, which are carried by the spindle 20 in the manner shown best in Fig. 1, is disposed within the frame 12 in spaced relation with respect to the cover 13 and the table 23.

The hub 46 of the member 45 is formed with an external conical surface 49 which is inclined outwardly so that the lower portion of said hub is greater in diameter than the diameter of the upper portion of the hub. The construction is such that the bottom of the hub 46 has a diameter approximately equal to the maximum diameter of the inner ring 30 of the table 23 so that the central opening through said table as provided by the ring 30 is substantially closed in order to prevent the passage of particles of material into or through the central opening in the table. In actual practice a slight clearance should be provided between the bottom of the hub 46 and the upper face of the ring 30 since the hub rotates with respect to the fixed table 23, but this clearance should only be of such an amount that the rotatable hub will not contact the upper surface of the ring 30 during operation of the machine.

Surrounding the hub 46 and disposed in suitable spaced relation thereto, is a conical wall 50 which is connected to the hub 46 by means of a plurality of radially disposed webs or vanes 51. The hub 46, the wall 50 and the vanes or webs 51 are preferably formed of a single casting. The bottom edges of the webs 51 of the member 45 are disposed substantially in alignment with the bottom of the hub 46 so that the lower portion of said webs will be disposed in suitable spaced relation with the upper surface of the table 23.

The webs 51 extend outwardly from the hub 46 a distance equal substantially to the distance between the outer face of the inner ring 30 and the inner face of the outer ring 28. The construction and arrangement of the parts is such that the webs 51 provide means which pass over the upper surface of the table 23 in suitable spaced relation thereto for the purpose of propelling or pushing the material toward the knife 37.

The wall 50 of the member 45 is formed with a lower portion 52 which is disposed in an inclined direction with respect to the vertical center line of the spindle 20, and an upper portion 53 which is inclined at a slightly different angular relationship to the vertical center line of the spindle 20 than is the inclination of the wall 52.

The portion 52 of the wall 50 inclines in a direction downwardly and outwardly from top to bottom thereof and the lower or bottom edge 54 of said wall is disposed at a considerable distance above the bottom of the webs 51. In fact, as shown in Fig. 1, it will be noted that the lower edge 54 of the wall 50 is disposed in approximately the same plane as is the upper portion of the hub 46.

From the lower edge 54 of the wall 50 the outer edges of the webs 51 continue downwardly and outwardly to the bottom of the webs at approximately the same angle of inclination as the angle of inclination of the portion 52 of the wall 50.

Surrounding the lower portion of the member 45 is a sheet metal cover 55 of conical form, said cover being secured to the webs 51 by means of screws 56, as shown best in Fig. 9.

The portion 53 of the member 45 surrounds the portion 15 of the chute 14, being suitably spaced therefrom as shown in Fig. 2. The upper edge of the portion 53 terminates at a suitable distance below the cover 13, and the portion 15 of the chute is arranged within the portion 53.

The member 45 provides a hopper in which the materials are deposited, and the webs 51 divide the lower portion of this hopper into a plurality of compartments 57. The chute provided by the elements 14, 15 is stationary, and the hopper provided by member 45 is rotatable, and so that the materials delivered to the hopper will be readily delivered to the several compartments 57 without clogging, the upper edges 58 of the webs 51 are formed with the contour shown best in Fig. 2, wherein it will be noted that from the top of the hub 46, the edges 58 of the webs extend outwardly in the form of an arc and then extend upwardly and outwardly at a slight angle with respect to the vertical center line of the hub 46 to the upper rim of the outer wall 50 of the member 45.

Preferably formed integral with the upper portion 53 of the wall 50 and extending outwardly from said wall, is an annular flange 59 which provides a support for a ring gear 60. The gear 60 is secured to the member 45 by bolts 61, as shown in Figs. 1 and 2. The teeth of the ring gear 60 are in meshing relationship with the teeth of a gear 62 mounted on the shaft 63 of an electric motor 64.

As shown in Figs. 1 and 5, the frame 12 is formed with guideways 65 for the lower flanged portion 66 of a bracket 67 for supporting the motor 64 in such position on the machine that the shaft 63 is vertically disposed. The main body of the motor 64 is secured to the upper portion of the bracket 67 by means of bolts 68.

The motor 64 and its bracket 67 are slidably mounted as a unit on the guideways 65 in a direction either towards or away from the ring gear 60 so that the teeth of the gears 60, 62 can be properly meshed. Another feature is that, should it be desired, the motor shaft 63 can be provided with gears of sizes other than the size of the gear 62 herein shown so that the speed ratio between the motor and the gear 60 can be altered to suit various conditions.

When the parts are adjusted to the desired position, the bracket 67 is fixed rigidly in place on the frame 12 by means of clamping members 69 which are removably secured to the frame by bolts 70, as shown best in Fig. 5.

In order to aid the operator in positioning the motor 64 in the desired location on the frame 12, a pin 71 arranged to be inserted in aligned openings 72, 73 and 74, formed in one of the clamping members 69, flange 66 of the bracket 67 and in the top of the frame 12, respectively, is provided, as shown in Fig. 5. The construction and arrangement of the parts is such that the several openings 72, 73 and 74 are aligned and the pin 71 inserted therein, before the clamping members 69 are tightly secured in place. After the motor and its bracket have thus been properly positioned, the bolts 70 should be turned down tight to fixedly secure the clamping members 69 against the flange 66 of the motor supporting bracket 67. In addition to the opening 72, 73 and 74, herein shown, additional openings may be provided so that gears of different diameters can be substituted for the gear 62 and the relative position of the motor 64 on the frame changed accordingly.

Disposed within the frame 11 beneath the table 23 in position to receive the slabs of material discharged through the gap 43, is a slicing mechanism which is constructed and arranged so that the slabs of material are each severed lengthwise into elongated strips.

Figure 4:
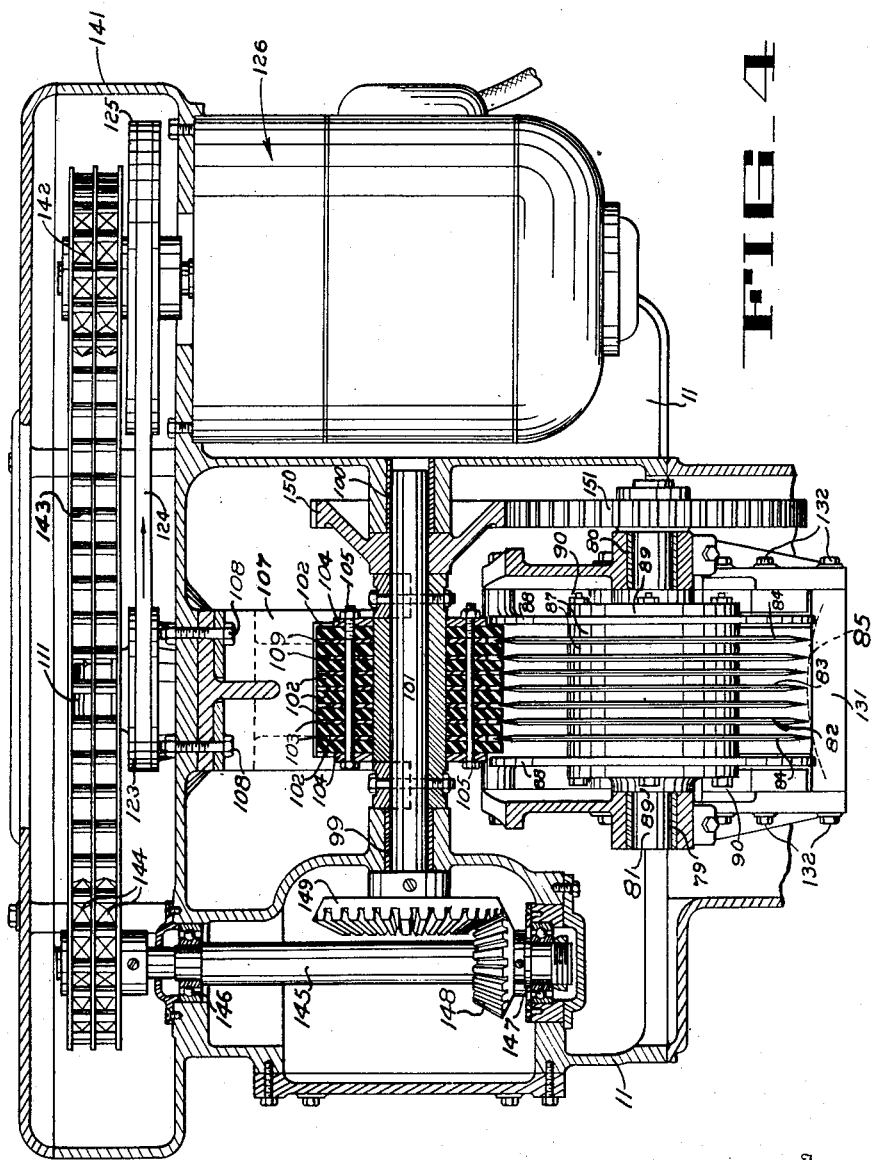
Fig. 4 is an enlarged horizontal sectional view taken along the line 4—4 of Fig. 1.

The strip slicing mechanism comprises a shaft 81 supported by bearings 79, 80, mounted in the frame in the manner shown best in Fig. 4. Mounted on shaft 81 is a gang of circular cutting knives 82 having their peripheries ground to a tapered cutting edge. The circular cutting knives 82 are not all of the same diameter. As can be seen in Figs. 1, 4, 7 and 8, the diameters of the knives 82 are varied so that the center knife 83 of the gang is of the least diameter and the end knives 84 are of the greatest diameter; and the diameters of the intermediate knives are graduated so that in any section of the gang, the cutting edges of the knives terminate in an arc indicated by dotted line 85, Fig. 8. This gives the gang of knives 82 a concave periphery which is provided for the reception of the cube cutter 86.

The knives 82 are equally spaced apart on the shaft by means of spacer disks 87. Adjacent the two end spacer disks are closure disks 88. The purpose of the closure disks 88 is to prevent escape of the material axially of the shaft 81 as will appear later. The knives 82, the spacer disks 87, and the closure disks 88, are assembled on the shaft 81 and held together as a unit by means of heads 89 and bolts 90. The arrangement is such that the gang of rotatable knives 82 is disposed in a plane transversely to the plane of the slab cutting knife 37.

Extending from the block 33 in the direction in which the slabs of material travel after being discharged from the table 23, is a member 91 which is bolted to the frame 11, as indicated at 92, Figs. 2 and 4.

The member 91 is formed with an arcuate surface 93 that has a contour which conforms substantially to the contour of the peripheries of the gang of knives 82, as shown in Fig. 7, the surface 93 of said member being disposed in suitable spaced relation with respect to the peripheries of the knives 82 so that there is a slight clearance between the cutting edges of the knives and the surface 93 of the member 91. Also, as shown in Fig. 7, the member 91 has a width slightly less than the distance between the two closure disks 88 of the rotary strip slicer.

The construction and arrangement of the parts comprising the rotary strip slicer and the member 91 is such that the slabs are confined between the end closure disks 88 and the member 91 so that the rotatable knives 82 can cut the slabs of material into strips. However, since the surface 93 of the member 91 is spaced slightly from the peripheries of the knives 82, the strips may not be completely severed from the slabs of material. Furthermore, since the cutting edges of the knives 82 are tapered the material will be held by the gang of knives 82 in contact with the surface 93 of the member 91, and since the slabs are discharged from the table 23 successively in end to end relationship, they will remain in such end to end relationship during the strip slicing operation.

The lower portion of the member 91 terminates at a suitable distance above a horizontal plane intersecting the center of the shaft 81, and located below said member 91 is a member 95 which constitutes a track for supporting the strips of material.

The track 95 is formed with an arcuate wall that has an inner surface 96 of a contour which conforms substantially to the contour of the peripheries of the gang of strip slicing knives 82, as shown in Fig. 8, said surface being disposed in suitable spaced relation with respect to the peripheries of the knives 82 so that there is a slight clearance between the cutting edges of the knives and the surface 96 of the track 95. The upper end 97 of the track 95 is disposed below the lower end 98 of the member 91 so that there is a gap between said member and said track.

A shaft 101, which is supported in the frame 11 by bearings 99, 100, has mounted thereon and rotatable therewith, a pressure roller comprising a plurality of circular sections or disks 102 of uniform diameter which are equally spaced apart on the shaft 101 by means of spacer disks 103 of suitable thickness. Adjacent the two end disks 102 are outside disks or head plates 104. The disks 102, 103 and 104 are assembled on the shaft 101 and held together as a unit by means of bolts 105.

The shaft 101 is mounted in the frame 11 in parallel spaced relation with respect to the shaft 81 so that the pressure roller has a peripheral portion disposed in the space between the member 91 and the track 95. The sections or disks 102 of the pressure roller are spaced apart such distances that said sections extend in between adjacent knives of the gang of knives 82 and in beyond the cutting edges of said knives for engaging the material and cause the strips to be completely severed from each other and to be wedged between the knives 82 so that the strips will be carried forwardly by said knives.

In order to prevent injury to the cutting edges of the knives 82 and at the same time provide a cushion for the pieces of material, the sections or circular disks 102 of the pressure roller should preferably be formed from rubber or similar resilient material.

For the purpose of keeping the spaces between the several rubber disks 102 of the pressure roller free of pulp and other foreign matter, a stripper 107 is provided. The stripper 107 is secured to the frame 11 of the machine, as indicated at 108, Fig. 2, and has a plurality of members 109 which are formed with pointed portions 110 that extend in between adjacent disks 102, as shown in Figs. 2 and 4. The construction of the parts and the manner in which the stripper 107 is arranged with the rubber disks 102 is such that foreign matter will be removed from the pressure roller and fall to the bottom of the machine.

The cube cutter 86 is mounted on a shaft 111 and comprises a plurality of similar knives 112 (four being shown in the present instance) having a special contour for a purpose which will be explained later.

Figure 11:
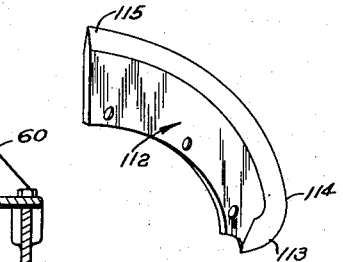
Fig. 11 is a perspective view of one of the cube cutter blades shown in Fig. 10.

As shown best in Fig. 11, each knife 112 has a low point 113 connected by a short radius curve to a point 114 which is connected by a long radius curve to the high point 115. As the shaft 111 rotates, the high points 115 describe the circle 116 (Fig. 1) and due to the concave periphery of the knives 82, the high points 115 pass close to each knife 82 in the strip slicing gang, the clearance between the high points of the cube cutter 86 and the peripheries of the knives 82 being very small and uniform.

Figure 10:
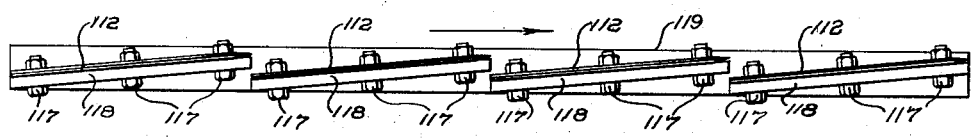
Fig. 10 is a development of the cube cutter.

The knives 112 are also arranged helically with respect to the shaft 111, as shown in Fig. 10. Each knife 112 is secured by bolts 117 to a flange 118 on a hub 119. The flanges 118 are disposed helically on the hub 119 which is keyed to the end of the shaft 111, as indicated at 120, Fig. 1. The shaft 111 is supported by bearings such as 121 in a cylindrical housing 122 secured to the frame 11. At its other end the shaft 111 is provided with a pulley 123, which is driven by a belt 124 from a pulley 125 on the shaft of an electric motor 126.

The arrangement of the cube cutter 86 with respect to the knives 82 of the strip slicing mechanism is such that the concave periphery of the knives 82 is formed as though the cube cutter were a milling cutter which had actually milled an arcuate groove in the periphery of the gang of knives 82. The purpose of this is to cause the periphery of the gang of knives 82 to conform to the periphery of the cube cutter so that the cube cutter will fit into the gang of knives 82 and will cut cubes from the strips of material the instant the strips emerge from the knives 82 and while the strips are still held wedged between said knives.

To guide the strips of material from the gang of knives 82 to the cube cutter 86, a stripper 131 (Fig. 3) is provided. The stripper 131 is secured to the frame 11 of the machine as indicated at 132, and has a plurality of fingers which project horizontally in between the knives 82. The inner ends of the stripper fingers are formed arcuately as at 133, to provide a closure fit with the spacer disks 87. Each stripper has an inclined edge 134 which leads to a throat formed between the bottom edge 135 of the stripper and the surface 96 of the track member 95. The bottom surface of each stripper finger is horizontal and the fingers are arranged in an arc concentric with shaft 111. The bottom surfaces are slotted along an arc concentric with shaft 111, the arcuate slot appearing at 137 in Fig. 3. It will be understood that each finger of the stripper 131 is slotted so as to provide a continuous arcuate slot to receive the high points 115 of the cube cutter knives 112. This portion of the mechanism has been enlarged in Fig. 3, where it will be seen that the slot 137 admits the high point 115 of the cube cutter knife 112 and that the high point 115 passes close to the periphery of the slicing knife 82. Only the high point 115 of each knife 112 enters the slot 137. Neither the low point 113 nor the intermediate points of each knife 112 enter the slot 137.

As shown in Fig. 4, the frame 11 includes a portion 141 which extends out to one side. The motor 126 heretofore referred to is mounted on the portion 141 of the frame 11. The shaft of the motor 126 has mounted thereon a double sprocket wheel 142 which is connected by a pair of chains 143 to a double sprocket 144 keyed to a shaft 145 supported by bearings 146, 147 carried by the frame 11.

Mounted on the shaft 145 is a bevel gear 148, the teeth of which are in meshing relationship with the teeth of a bevel gear 149 to an end of the shaft 101 of the pressure roller.

The end of the shaft 101 opposite to the end carrying the gear 149 has mounted thereon a gear 150 meshing with a gear 151 on shaft 81.

From the foregoing it will be noted that the member 45 is operated by motor 64 to cut the slabs of material and that the strip slicing knives 82, the pressure roll provided by the rubber disks 102 and the cube cutter knives 112 are operated by motor 126. There is no intricate timing of parts anywhere in the machine, so that the slipping of a gear cannot affect the operation of the machine as a whole. It will be noted that all of the knives of the machine are given firm support so that they have great strength and rigidity and are not apt to break easily. The member 45 feeds the slabs of material through the slabber and the knives 82 and rubber disks 102 feed the material toward the cube cutter knives 112 due to the fact that the strips of material are wedged between the knives 82, the strippers being employed to guide the material so that no supplementary feeders or conveyors are required.

The slabs of materials which pass through the step or opening 43 in the table 23 follow a somewhat arcuate course or path around the surfaces 93, 96, and by the time the slabs of material have been sliced into strips and are ready to be diced by the cube cutter knives 112, they will have followed a substantially semi-circular course in which the several pieces of material are maintained in end to end relationship as indicated by the broken lines in Fig. 3.

In operation, and for purpose of illustration, let it be assumed that the hopper 45 contains a quantity of peaches, or the like, which have been cut into halves and otherwise prepared for dicing, the peaches being disposed in the several compartments of the hopper provided by the vanes 51. In Fig. 3, one piece 138 of a peach is shown by broken lines on the lower portion of the table 23 in position against the cutting edge 42 of the knife, and another piece 139 of a peach is shown by broken lines on the higher portion of the table.

Due to the rotary movement imparted to the hopper 45 by its driving mechanism, a vane 51 will push the piece 138 past the knife 37 and the knife will detach a slab therefrom, such as is indicated at 140.

As soon as the piece 138 is moved into engagement with the knife 37, the lower portion thereof, which subsequently becomes the slab 140, is directed by the underside of the knife and the downwardly inclined surface 36 of the block 33 toward the cutting edges of the gang of knives 82. As the knives 82 cut into the slab 140 to form strips they draw the slab forwardly along the curved surface 93 of the member 91. In this way the slab is moved forwardly from the piece 138 by the combined pushing action of vane 51 and the pulling action of the knives 82, until the slab 140 is completely severed or detached from the piece 138. The remaining piece of peach which is now thinner than the piece 138 then moves along the upper surface of the knife 37 and the top of the table 23, as indicated at 139. The thinner piece 139 is then pushed by vane 51 around the helically convoluted table 23 until it is again brought into engagement with the knife 37 where the operation of cutting a slab therefrom is repeated. In this way a piece of material is moved by the hopper repeatedly into engagement with the knife 37 until the piece has been entirely cut into slabs.

Due to the fact that the cutting edges of the knives 82 are ground to a taper, the plurality of strips into which the knives 82 cut a slab, will be wedged between said knives and will be carried thereby around to the position indicated at 153, Fig. 3. The disk 102 of the pressure roller now engage the strips of material and cause the strips to be completely severed from each other and to be wedged tighter in between the knives 82, as indicated at 154, so that the strips will be carried forwardly by said knives toward the stripper 131. The strips of material will be arranged in end to end relationship during movement of the material around the member 91 and track 95, as shown by broken lines in Fig. 3.

The gang of strips of material which have been severed from the slab next enter the throat and are carried by the knives 82 into contact with the under surface 135 of the stripper 131. As the knives 82 continue to rotate, the strips will be fed thereby along the surface 135 and presented to the cube cutter in the position indicated at 155, Fig. 3. Due to the rotation of the knives 82, the strips 155 are held in contact with the under surface 135 of the stripper and are fed outwardly along this surface. The surface 135 is made perpendicular to the plane of the cube cutter so that the cut of the knife 112 will be at right angles to the length of the strips. Furthermore, due to the fact that the gang of strips 155 are still wedged in between the knives 82, they are prevented from moving laterally, and the strips are fed out through the channel, the top of which is the underside of the stripper, and the two side walls of which are the circular knives 82. As the strips of material emerge from these channels cubes are cut from them by the cube cutter knives 112, and drop from the knife 112 into a discharge spout 152.

The cube cutter is designed to bring its cutting edges as close as possible to the edges of the knives 82 to take full advantage of the fact that the material is being held against lateral displacement because it is wedged between the slicing knives. It has already been explained that the periphery of the gang of knives 82 is concave to fit the circular path 116, Fig. 1, of the high points 115 of the cube cutter knives. In addition, the intermediate points of the cube cutter knives are brought as close as possible to the knives 82, so that the strips will be cut uniformly and accurately into cubes.

While I have described a particular embodiment of the present invention, it will be obvious that various changes and modifications may be made in the details thereof without departing from the spirit of the present invention and the scope of the appended claims.

Having thus described my invention, what I claim and desire to secure by Letters Patent is:

1. A cutting machine of the character described comprising in combination a table shaped to provide an annular material supporting surface formed as a helix having approximately one convolution, the ends of the helix being spaced apart vertically to provide an opening through which the material is discharged from the table, a knife mounted in the table and having a cutting edge disposed substantially radially with respect to the center of curvature of the table, said knife being disposed at the top of the space between the ends of the helix, an opening formed centrally through said table, a spindle extending vertically through said opening and being arranged in spaced relation to the wall of the opening, a conical hopper, said hopper having a hub with a conical exterior and an exterior wall arranged in spaced relation to said hub and connected thereto by a plurality of radially disposed vanes, the exterior of said hub and the exterior wall of said hopper being angularly disposed with respect to the vertical axis of the spindle so that the bottom of said hub covers the central opening in said table and the bottom of said exterior wall is disposed in proximity to the periphery of said table, means for supporting said hub on said spindle whereby said hopper is rotatable about a vertical axis, said vanes dividing the hopper into a plurality of material receiving compartments and being arranged to move material in said compartments toward said knife, and means for rotating said hopper.

2. A cutting machine of the character described comprising in combination a helical surface for supporting material, said helical surface having annular corrugations thereon, the ends of the helical surface being axially spaced apart to provide a step in the helical surface through which the material is discharged, a knife mounted flush with the corrugated surface for cutting the material into slabs having a predetermined thickness, and a downwardly flaring conical hopper mounted for rotation with the larger end of the hopper adjacent to the helical surface, said hopper having radial arms for dividing the interior of the hopper into material receiving compartments for confining charges of material and for advancing the material toward said knife to cut the material into slabs.

3. A cutting machine of the character described comprising in combination a member having a helical material supporting surface, the adjacent ends of the helical surface being spaced apart axially to provide a step in the surface through which the material is discharged, a knife mounted in the member flush with the helical surface for cutting the material into slabs having a predetermined thickness, and a downwardly flaring conical hopper mounted for rotation with the larger end of the hopper disposed adjacent to the helical surface of said member, said hopper having means formed therein for dividing the material into separate lots and for advancing the material toward said knife whereby the material is cut into slabs.

4. In a machine for cutting food material into slabs, a stationary table having a stepped food supporting surface, a knife mounted at the step of said surface, a rotatable hopper overlying the table, said hopper having an exterior wall formed with a conical interior surface angularly disposed downwardly and outwardly with respect to the vertical axis of the hopper, a series of substantially vertically disposed vanes within the hopper, said vanes dividing the hopper into a plurality of material receiving compartments, said vanes being arranged to move material in said compartments toward said knife, means for supporting said hopper for rotation about a vertical axis, and means for rotating the hopper whereby the material within the hopper is pressed down against the table by the combined action of centrifugal force and the conical interior surface of the exterior wall of the hopper.

5. In a machine for cutting food material into slabs, a stationary table having an annular inclined surface formed with a vertically disposed step, said step having an opening therein through which material is discharged from the table, a knife mounted in the table at the top of the step, a rotatable conical hopper overlying the table, said hopper having a hub with a conical exterior and an exterior wall having a conical interior surface arranged in spaced relation to said hub and connected thereto by a plurality of vanes which divide the hopper into a plurality of material receiving compartments, the exterior of said hub and the conical interior surface of the exterior wall of said hopper being angularly disposed with respect to each other, means for delivering material toward the hub of the hopper, means for supporting said hopper for rotation, and means for rotating the hopper whereby the material within the hopper under the influence of centrifugal force tending to move the material away from the hub is pressed down against the table by the combined action of centrifugal force and the conical interior surface of the exterior wall of the hopper.

6. In a machine for cutting food material into slabs, a stationary table having a helically convoluted surface to receive material to be cut, the inclination of the helix being such as to provide a step in the surface of the table at the ends of the helix, a knife mounted in the table and disposed at the top of the step, a rotatable conical hopper overlying the table, said hopper having a hub with a conical exterior and an exterior wall having a conical interior surface arranged in spaced relation to said hub and connected thereto by a plurality of radially disposed vanes dividing the hopper into a plurality of material receiving compartments, the exterior of said hub and the conical interior surface of the exterior wall of said hopper being angularly disposed downwardly and outwardly with respect to the vertical axis of the hopper, the bottom of said hopper covering an annular zone of said stationary table with the bottom of said exterior wall disposed in proximity to the periphery of said table, means for supporting said hopper for rotation about a vertical axis, said vanes being arranged to move material in said compartments toward said knife, and means for rotating the hopper, whereby the material is urged toward the helical surface of the table by the combined action of centrifugal force and inclined interior surface of the exterior wall of said hopper.

7. A cutting machine of the character described comprising in combination a table shaped to provide a material supporting surface formed as a helix having approximately one convolution, a knife mounted in the table and disposed at the top of the space between the ends of the helix, a rotatable hopper overlying said table, said hopper having a hub and an exterior wall having an interior surface inclined at an angle with respect to the vertical center line of the hopper and sloping downwardly and outwardly from the upper portion of the hopper, a plurality of radially disposed vertical vanes connecting the exterior wall and the hub to divide the hopper into a plurality of material receiving compartments, said vanes being arranged to move material confined in the compartments of said hopper along the helical surface of the table toward said knife, means for rotatably supporting said hopper, and means for rotating the hopper whereby the material is urged toward the helical surface of said table by the combined action of centrifugal force and the inclined surface of the etxerior wall of said hopper.

8. A cutting machine of the character described comprising a stationary table shaped to provide an annular material supporting surface formed as a helix having approximately one convolution, the ends of the helix being vertically spaced apart to provide an opening through which the material is discharged from the table, a knife fixedly mounted in the table and disposed at the top of the space between the ends of the helix, a rotatable hopper overlying said table, said hopper having a conical hub and an exterior wall spaced from the hub, said hub having a side wall which is inclined outwardly and downwardly from the top of the hub, said exterior wall of the hopper extending above the top of the hub and having an interior surface sloping downwardly and outwardly from the upper portion of the hopper so that the upper portion of the hopper provides a narrow neck which is disposed in a plane above the top of the hub, a plurality of radially disposed vanes connecting the exterior wall to the hub to divide the hopper into a plurality of material receiving compartments, said vanes having an upper edge portion extending from the top of the hub upwardly to the neck of the hopper, means for rotating the hopper, and a stationary conical material receiving member arranged above the rotatable hopper, said stationary member having an inner surface sloping downwardly and inwardly from the upper portion thereof and terminating within the neck of the rotatable hopper whereby the material will be delivered through the narrow neck of the rotatable hopper and will be directed toward the top of the hub and will thence be directed by the inclined surface of said hub downwardly toward the helical surface of said table, the inclined inner surface of the exterior wall of said rotatable hopper being arranged to direct the material in the several compartments downwardly toward the helical surface of said table.

9. In a machine for cutting food material into slabs, a stationary table having a stepped food supporting surface, a knife mounted at the step of said surface, a downwardly and outwardly flared rotatable hopper overlying the table, said hopper having a narrow upper neck through which material is introduced into the hopper, means for supporting the hopper for rotation about a vertical axis, a ring gear fixedly secured to the neck of the hopper, and power means operatively connected to said ring gear by which rotative force is imparted to said hopper.

10. In a machine for cutting food material into slabs, a horizontally disposed helical cutting table, a downwardly and outwardly flared rotatable hopper overlying the table, said hopper having a narrow upper neck through which material is adapted to be introduced toward the central portion of the hopper, and a material receiving member arranged above the rotatable hopper, said member having a constricted discharge opening formed therein and disposed within the neck of the rotatable hopper whereby the material will be discharged from said member at a point below the rim of the neck of the rotatable hopper.

ALBERT R. THOMPSON.

REFERENCES CITED

The following references are of record in the file of this patent:

UNITED STATES PATENTS

| Number | Name | Date |
|---|---|---|
| 1,157,013 | Lewis | Oct. 19, 1915 |
| 1,280,372 | Beckner | Oct. 1, 1918 |
| 1,303,617 | Tuck | May 13, 1919 |
| 1,890,103 | Watson | Dec. 6, 1932 |
| 1,953,714 | Jenkins | Apr. 3, 1934 |
| 1,955,360 | Ferry | Apr. 17, 1934 |
| 2,084,921 | Skliris | June 22, 1937 |
| 2,106,711 | Berkman | Feb. 1, 1938 |
| 2,187,252 | Urschel | Jan. 16, 1940 |
| 2,223,542 | Bauer | Dec. 3, 1940 |
| 2,242,557 | Urschel et al. | May 20, 1941 |
| 2,318,904 | Thompson | May 11, 1943 |
| 2,349,212 | Urschel et al. | May 16, 1944 |

FOREIGN PATENTS

| Number | Country | Date |
|---|---|---|
| 289,763 | Germany | Jan. 18, 1916 |
| 242,614 | Great Britain | Apr. 1, 1926 |